(12) United States Patent
Santangelo et al.

(10) Patent No.: US 8,924,999 B1
(45) Date of Patent: Dec. 30, 2014

(54) METHODS AND APPARATUS FOR PROVIDING INDIVIDUAL SERVICE SUBSCRIBERS CONTENT RELATED SERVICES AT ONE OR MORE LOCATIONS

(75) Inventors: Bryan Santangelo, Tulsa, OK (US); Chris Cholas, Frederick, CO (US); George Sarosi, Niwot, CO (US); Albert William Straub, Westminster, CO (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 13/355,235

(22) Filed: Jan. 20, 2012

Related U.S. Application Data

(60) Provisional application No. 61/582,358, filed on Dec. 31, 2011.

(51) Int. Cl.
*H04N 7/16* (2011.01)
(52) U.S. Cl.
USPC .................................. 725/25; 725/9; 725/10
(58) Field of Classification Search
USPC ................................................ 725/9, 10, 25
See application file for complete search history.

(56) References Cited

U.S. PATENT DOCUMENTS

| | | | | |
|---|---|---|---|---|
| 7,917,933 | B2 * | 3/2011 | Thomas et al. | 725/88 |
| 8,104,066 | B2 * | 1/2012 | Colsey et al. | 725/141 |
| 8,464,292 | B2 * | 6/2013 | Xiao et al. | 725/46 |
| 2003/0073411 | A1 * | 4/2003 | Meade, II | 455/70 |
| 2008/0141293 | A1 * | 6/2008 | Blanchard et al. | 725/28 |
| 2011/0154385 | A1 * | 6/2011 | Price et al. | 725/12 |

* cited by examiner

*Primary Examiner* — Olugbenga Idowu
(74) *Attorney, Agent, or Firm* — Straub & Pokotylo; Michael P. Straub; Stephen T. Straub

(57) ABSTRACT

Methods and apparatus for providing individual customized content delivery features and services to service subscribers are described. Individual service subscribers are issued devices such an RFID chip or IR device such as a remote control capable of transmitting service subscriber identification signals and/or records. A set top box detects signals used to identify individual subscribers and determines a subscriber identifier corresponding to each of the identified subscriber(s) and/or receives service profile record and/or service preference information from the user device. Service and/or other customer records corresponding to detected service subscriber(s) are used to determine what services and/or features are to be provided, what program channels may be accesses, what recorded programs corresponding to a subscriber may be accessed and, in some embodiments, service preference information such as personal preferences/settings relating to program guide presentation.

20 Claims, 10 Drawing Sheets

METHODS AND APPARATUS FOR PROVIDING INDIVIDUAL SERVICE SUBSCRIBERS CONTENT RELATED SERVICES AT ONE OR MORE LOCATIONS

RELATED APPLICATIONS

The present application claims the benefit of U.S. Provisional Patent Application Ser. No. 61/582,358 filed Dec. 31, 2011, entitled "Methods and Apparatus for Providing Individual Service Subscribers Content Related Services, including Video Services, at One or More Locations" which is hereby expressly incorporated by reference in its entirety.

FIELD

The present application relates to methods and apparatus for providing one or more content, e.g., video, related services and, more particularly, to methods and apparatus for providing individuals customized and/or premium services.

BACKGROUND

Customers of cable TV and/or other video services often pay a premium to be entitled to watch premium channels such as premium movie, sports or news channels. Service subscriptions are often for services provided to a specific customer location, sometimes referred to as a customer premise which is often a home or business location corresponding to a service subscriber.

Individuals corresponding to a particular customer premise may customize the program guide menus, parental control features, etc., so that the features are customized to suit their own tastes and/or to take into consideration the age of individual member's of a household.

In addition to creating customized program guides and/or setting individual service options including, e.g., customized guide display options, in some systems, individuals corresponding to a household, e.g., customer premise, may create personal libraries of recordings. While some recordings may be available and accessible to all members of a household, access to personal recordings and/or specific content recorded by an individual may be intentionally restricted in terms of access to that individual.

Currently in many cable systems if an individual starts a communications session at one set top box and moves to another location, the user must initiate a new video delivery session and find the location at which to begin watching a program again if they wish to see the end of a video or other program that they were watching. Thus, in addition to the various above discussed features that individuals may have come to expect at least while at home where they subscribe to a service, individuals may also desire the ability to initiate a video and/or content delivery session and continue it at another location, e.g., via a different set top box.

While a user may customize his/her home services at one set top box, it would be nice if there was an easy way for the user's service customization information to be available wherever the user traveled, e.g., at another set top box, so that it was readily available for use by set top boxes wherever the user might move whether the movement is within a house or to another site entirely, e.g., at a different location, e.g., premise, corresponding to another customer.

From the above discussion it should be appreciated that while cable TV and other video service providers have been able to provide individuals a high degree of service customization at an individual set top box used by a service subscriber, there remains a need to increase the portability of user information and/or the customization of features and services which can be supplied to an individual as the user moves within a house or travels from one customer premise, e.g., home, to another.

SUMMARY OF THE INVENTION

Methods and apparatus for providing individual customized content delivery features and services to service subscribers, e.g., users, are described. In some embodiments individual service subscribers are issued devices such an RFID chip or IR device such as a remote control capable of transmitting service subscriber identification signals and/or subscriber records/preference information. Alternatively or in addition to the issuance of such devices which transmit identification signals, individual service subscribers are issued identification codes, e.g., a secure code which identifies an individual subscriber. The secure code is transmitted by a wireless device, e.g., cell phone, tablet computer, etc. used by the service subscriber.

A set top box detects signals from a user, e.g., portable device, used to identify one or more individual subscribers, e.g., users, and determines a subscriber identifier corresponding to each user identified by the user device. The signal from the device may, and in some embodiments does, communicate user settings and/or preference information. Thus, at least in some embodiments user preference information is communicated by the user device as the user passes into range of the set top box.

User preference information and/or other user information communicated from the user device to the set top box can be used in configuring services provided to the user and/or retrieving additional information corresponding to the user including premium channel information.

In cases where user preference information is stored in and communicated to the set top box via the user device, the set top box can implement program guide presentation format and/or other user preferences without the need to receive additional information from an external source or to have already stored a customer record corresponding to the individual service subscriber, i.e., user. Thus, in at least some embodiments, a user device such as a remote control, cell phone or other device capable of transmitting signals to a set top box provides all or part of a subscriber record which can be used by the set top box to provide and/or customize services including the presentation of program guides.

Thus, a remote control or other device can act as a secure portable subscriber record communication device corresponding to an individual subscriber reducing and/or eliminate the need for a set top box to obtain such subscriber record information from another device or having to pre-store such information.

In accordance with various embodiments, service and/or other customer records corresponding to the detected service subscriber are accessed and used to determine what services and/or features are to be provided, what program channels may be accessed, what recorded programs corresponding to a subscriber may be accessed and, in some embodiments, service preference information such as personal preferences/ settings relating to program guide presentation. Subscriber service records for individual subscribers are, at least in some embodiments, received from portable user devices, e.g., with the records of individual subscribers being stored in and communicated by different devices where the devices are issued or programmed to be used by a particular service subscriber.

In other embodiments the subscriber records are stored in the network headend, e.g., in a customer database which is accessible via a server located in the cable network, and also in one or more customer premise devices, e.g., set top boxes. In some embodiments, set top boxes corresponding to a particular customer premise location, e.g., home or office, are preloaded with subscriber service records corresponding to the individual subscribers who reside at, or otherwise are indicated to correspond to, the customer premise location. A set top box which detects the presence of an individual subscriber for which it does not have a customer record, may and in some embodiments does, request the customer record corresponding to the detected individual service subscriber from a server, e.g., a customer record server, in a cable network headend or at another location. The requested individual subscriber record is returned to the requesting set top box and is then used, in combination with the information in subscriber records of other detected individual subscribers, if any, to determine what services, channels and/or features to make available via the set top box doing the detection operation.

Depending on the particular embodiment, some or all of the information in a subscriber record may be communicated from a mobile user device to a set top box, received from a headend following receipt of a subscriber identifier signal, and/or pre-stored in a set top box.

Embodiments where subscriber record information is communicated via a user device directly to a set top box are particularly well suited for embodiments where a service subscriber may desire to interact with a set top box with limited connectivity back to the cable network headend of the subscriber's home residence or where the service subscriber may correspond to, e.g., have a contract with, a different cable network or service provider than the cable network or service provider corresponding to the set top box receiving the signal from the user device.

In some embodiments, the program channels which are made available for viewing, represent the combination of the program channels which are authorized by the service agreement corresponding to the customer premise where the set top box is located, plus any channels which an individual detected service subscriber is entitled to receive as a result of the service agreement corresponding to the customer premise with which the individual detected service subscriber is associated, subject to any content and/or channel sharing restrictions imposed by the individual detected service subscriber.

For example, consider an exemplary case where a neighbor who subscribes to a premium sports channel visits his friend's house who does not subscribe to the premium sports channel, and a set top box at the friend's house detects the presence of the neighbor. Assume further that the neighbor has not set his/her preference information to block sharing of one or more channels or content of a particular type. While at the friend's house, assume a set top box at the friend's house detects the presence of the neighbor. In accordance with one exemplary embodiment, the set top box at the friend's house will retrieve, from a server, the neighbor's subscriber record, determine that the visiting neighbor is entitled to view premium channels which are not otherwise to be made available at the friend's house and further determine that the visiting neighbor has not set any channels or content to be restricted from sharing. After making this determination, the set top box will make the premium sports channel and any other premium channels. to which the visiting neighbor is entitled to view at home. available from the set top box while the visiting neighbor's presence is detected. Thus, a visitor can, in essence, bring his premium channels from home with him to his friend's house so that the channels can be enjoyed in a group setting. In some embodiments, premium channel sharing is restricted to set top boxes which correspond to the same service provider, e.g., cable network service provider. In this way friends have an interest in encouraging one another to use the same service provider and thereby allow "sharing" of premium channels during visits or other communicable gatherings.

While sharing of premium channels can be considered a friendly activity and/or feature, unrestricted premium channel sharing can be embarrassing in some cases, e.g., where an individual subscribes to adult content channels and/or specific channels he/she might not want to make available to neighbors or friends simply by being present in their friends house. Accordingly, various features are directed to allowing an individual service subscriber to specify and set in the subscriber's records which program channels and/or which types of content should not be shared with others, e.g., based on the presence of the service subscriber in the proximity of the other individuals house. A service subscriber may select a setting blocking all channel sharing or simply block sharing of certain channels, e.g., such as Playboy, etc. and/or to block sharing of all adult content channels.

Assuming for example that the neighbor visiting the friend subscribed to an adult content channel such as Playboy, but had set channel sharing to block sharing of the Playboy channel or to block sharing of adult content. In such a case, the set top box detecting the presence of the neighbor would still make the premium sports channel available but block the adult content, e.g., Playboy channel, and the person who's house was visited would not be made aware that the visiting neighbor subscribed to the Playboy channel or any adult content.

In some embodiments, premium channel provisioning may be viewed as a set top box (STB) providing access to the combination of premium channels which any one of the detected service subscribers in the presence of the STB are entitled to view without taking into consideration at home viewing rights of individual subscribers which the individual subscriber has indicated should not be shared. For example, if two detected service subscribers have the right to view an adult channel and only one of them has set his personal sharing settings to block sharing of the adult channel, the adult channel would still be made available to the group of users based on the right of the service subscriber who did not block sharing of the adult channel. Thus, premium channel viewing rights depends in some embodiments on the rights of individual service subscribers to view channels at their own homes with the number of channels which can be viewed potentially increasing as the group of individual's in the presence of a set top box increases.

While premium channel viewing rights may move with and/or be associated with individual service subscribers, parental controls and viewing restrictions may also move with and/or be associated with individual service subscribers. This has the potential of decreasing the number of channels a group may view as new individual's join the group and their presence is detected by a set top box. For example, viewing of adult content may, and in some embodiments is, blocked and/or paused when the presence of a service subscriber, e.g., child, subject to an adult content parental control, is detected whether that child is a member of the household where the set top box detecting the child's presence is located or at a friend's house.

In some embodiments while premium channel sharing is restricted to set top boxes corresponding to the same service provider, parental control restriction information is not restricted to STBs corresponding to the same service provider. Thus, child safety and viewing restrictions are promoted between different network/service providers while premium channel access sharing is restricted within the same service provider/network to encourage service provider loyalty among friends.

In addition to premium channel sharing and group parental control features based on the detected presence of individual services subscribers, numerous additional features and embodiments are made possible by subscriber presence detection features in combination with the ability to access stored subscriber record and/or other information corresponding to individual subscribers who are detected in the presence of a set top box.

For example, in some embodiments program guide content and/or the display format of the program guide are based on the information included in one or more individual subscriber records. In accordance with one feature of the invention different priority levels may, and in some embodiments are, associated with different household members. In some embodiments the program guide display format and content are determined based on the service subscriber preference settings of a subscriber corresponding to the household in which the set top box detecting the presence of one or more service subscriber's is located. If no service subscribers corresponding to the household in which the set top box performing the subscriber detection operation is located are detected, the program guide display format preference information corresponding to the (non-household members) detected service subscriber having the highest priority among the one or more detected service subscribers is used.

Consider for example where a set top box detects the presence of a household member, e.g., child, with a priority level of 5 where a higher priority level is indicated by a higher priority number and the presence of two guests having priority levels of 7 and 8, respectively who do not correspond to the customer premise/household where the STB performing the detection operation is located. In such a case the child's program guide menu preferences would control the format of the program guide displayed. However, if the child was not present and only the guests were detected, the program guide presentation format information included in the subscriber record corresponding to the guest with the priority level of 8 would control the program guide display format. Display format options include, e.g., have the channels displayed in channel number order rather than grouped according to the program genre to which the program channels correspond, displaying on the channel list of the program guide all channels on including those which are blocks or only available channels, etc.

Thus, in at least some embodiments program guide format and, in some cases which channels are included in the listing (all channels or only available channels) is determined as a function of the information included in the subscriber records of subscribers detected to be in proximity of a set top box.

In accordance with still other features, access to stored programs and/or the ability to continue a content delivery session is facilitated and/or based on the detection of one or more service subscriber's in the proximity of a set top box. For example, in at least some embodiments, a service subscriber who initiated a content delivery session on one set top box is offered an opportunity to continue and/or resume the content delivery from a different set top box when the different set top box detects the presence of the service subscriber who previously initiated the content delivery session from another set top box. Thus, a service subscriber can have a content delivery session "follow" the service subscriber as the service subscriber moves from one location within a household to another, or even from one customer premise, e.g., household, to another.

Similarly, access to recorded programs and/or stored content which was stored by an individual subscriber can be made available in response to detection of the subscriber's presence by a set top box.

In the case of access to recorded programs and/or content delivery streams at locations outside the customer premise to which a subscriber corresponds, e.g., access at a neighbors or friends house rather than via a set top box in the subscriber's house, the channel/content sharing restriction setting may be set and used by the individual subscriber to avoid adult content or other potentially embarrassing or private content being supplied to a set top box outside the individual subscriber's household.

While described in the context of a set top box based implementation, it should be appreciated that the term set top box (STB) is to be interpreted broadly. In some embodiments a STB is implemented as a stand alone device with the display, e.g., a television, being coupled to the set top box. In other embodiments the STB is integrated into a television or display, e.g., as one or more modules which are coupled to a display device. The STB functionality may be integrated with a local digital video recorder and/or remote digital video recorder where the actual recording and/or storage of content occurs in a network or other device external to the STB.

From the above description it should be appreciated that the methods and apparatus of the present invention are well suited for supporting a wide range of features and can be used with a wide variety of techniques/sensor used to detect the presence of individual subscribers. For example, the methods can be used with subscriber specific RFID devices, infrared devices and/or wireless communications devices which allow a user's presence to be signaled and/or otherwise detected.

Various additional features and advantages of the present invention are discussed in the detailed description which follows.

DETAILED DESCRIPTION

Figure 1:
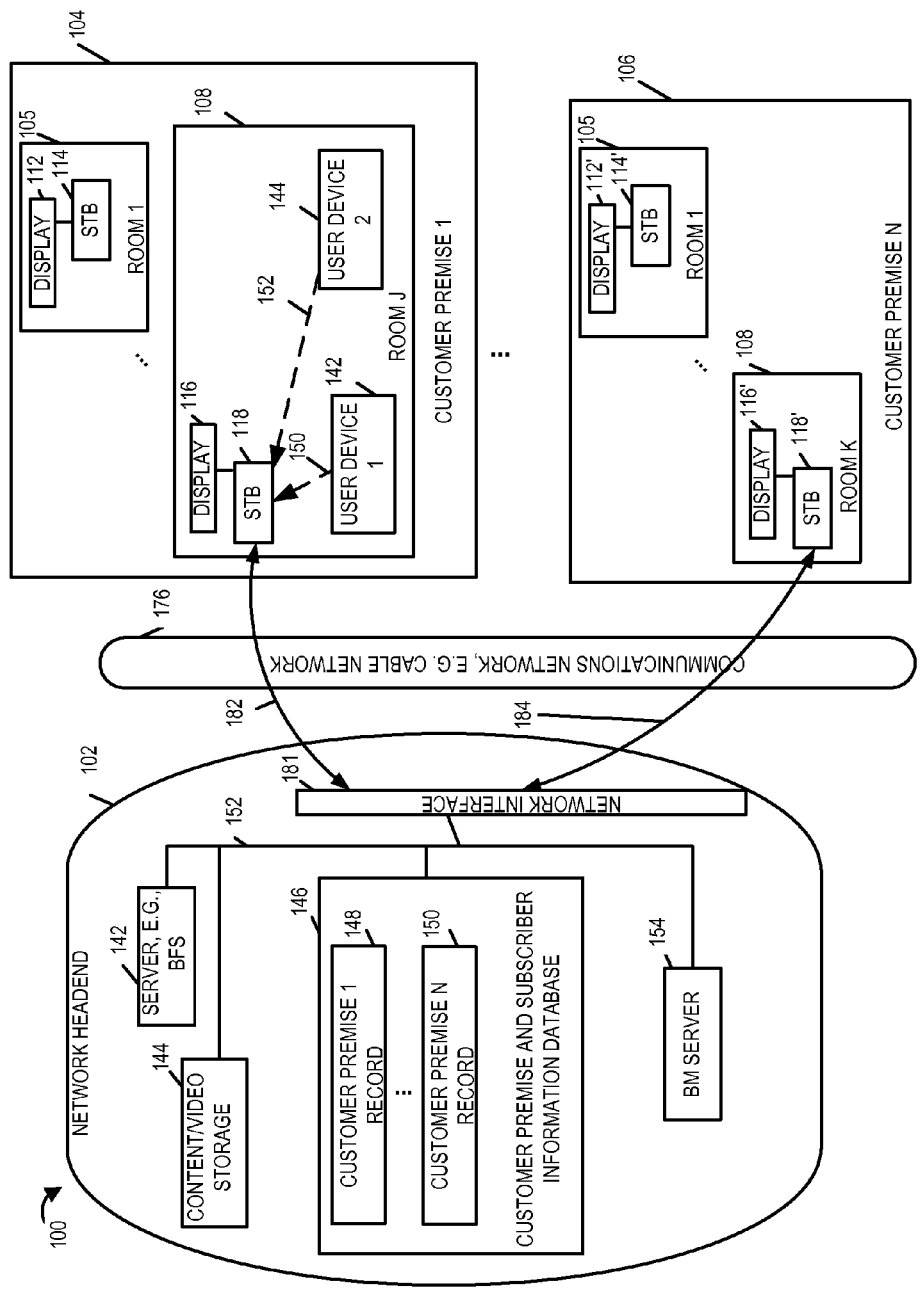
FIG. 1 illustrates an exemplary communications network implemented in accordance with the present invention.

FIG. 1 illustrates an exemplary communications network 100 implemented in accordance with the present invention. The exemplary system 100 includes a network headend 102, e.g., a cable network headend which may be located at a single building site, a communications network 176, e.g., a cable network, and a plurality of customer premises 104, 106. Each customer premise 104, 106 corresponds to a different physical site, e.g., home, office or apartment building corresponding to a customer. A plurality of service subscribers, e.g., family members may correspond to and be associated with an individual customer premise 104, 106. The network headend 102 includes a plurality of devices, e.g., a broadcast file server (BFS) 142, a content video storage device 144, a customer premise and subscriber information database 146, a business management server 154 and a network interface 181 which are coupled together as shown in FIG. 1 by bus 102. Via the network interface 181, the devices in the network headend are coupled via communications network 176 to set top boxes (STBs) 118, 114, 118', 114'.

Each customer premise includes a plurality of rooms 105, 108, 105', 108' with reach room including a STB 114, 118, 114', 118' coupled to a corresponding display device 112, 116, 112', 118'. It should be appreciated that the STB can be incorporated directly into a TV or other device in which case the STB and display would be a single device with the STB being a module within the combined device, e.g., network capable TV. The STB can, and in some embodiments does include or be combined with memory or other storage allowing the STB to operate as a digital video recorder (DVR).

Mobile user devices 142, 144 are shown in Room J 108 in the example shown in FIG. 1. The user devices may be handled devices such as remote controls with IR or RF signal transmission capability, tablet devices with WiFi capability and/or other types of devices such as cell phones or RFID chips or devices. The user devices 142, 144 are capable of storing and wirelessly transmitting, in a secure manner user information, e.g., service subscriber, record information, e.g., a user identifier and user service preference information. The user device 142 or 144 may be, and in some embodiments is, a device issued by the cable network and/or a device loaded by the cable network in a secure manner, e.g., via a cable network controlled app, with a subscriber service record including at least some information provided by the service subscriber and other information, e.g., parental control information and premium channel access authorization information, which can be loaded by the cable network. The user may be permitted to alter some of the information, e.g., user preference information, while being restricted from altering other information stored in the user device such as parental control information set by a parent or guardian and premium channel access privilege information set by the cable network service provider in accordance with a service agreement. The service record information included in the user device may also indicate a customer premise 104 or 106 to which the user device corresponds. Thus, a STB 118 receiving the subscriber record, e.g., via a wireless signal 150, 152, can readily determine a large amount of information quickly and easily from the user device, including whether the user device corresponds to a service subscriber visiting the customer premise 108 or a service subscriber which corresponds, e.g., is a member of the household, at which the STB 118 is located.

Figure 2:
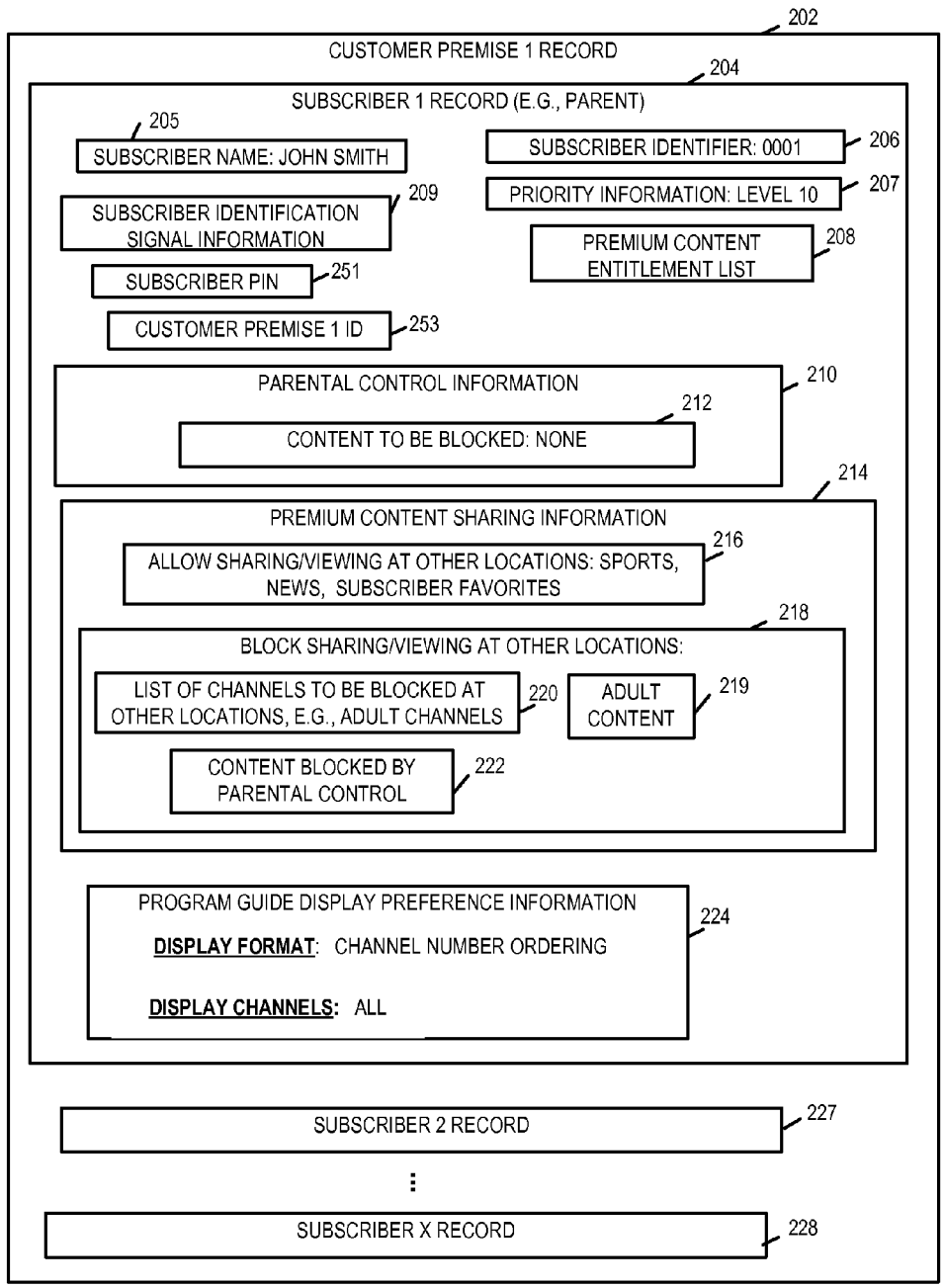
FIG. 2 illustrates an exemplary customer record corresponding to one of the customer premises, e.g., service subscriber homes or offices, shown in FIG. 1.

FIG. 2 illustrates an exemplary customer record 202 corresponding to customer premise 1, e.g., a household with a subscriber agreement with the cable service provider. The customer record 202 includes subscriber records 204, 227, 228 corresponding to the different members, e.g., service subscribers, of the household or business to which customer premise 1 104 corresponds. A copy 148 of the customer premise record 202 may, and normally is, stored in the customer premise and subscriber information database 146 in the headend and, in some embodiments, is also loaded into and stored within the STBs 118, 114 of the customer premise 104 to which the record 202 corresponds. Thus, individual subscriber records corresponding to a household are available from the business management server 154, or another service in the headend which can access the database 146, and supply the customer premise/subscriber record information stored therein as needed.

While in some embodiments STB's of a household are preloaded with the subscriber records corresponding the household/customer premise, in some embodiments the STBs 118, 114 are not preloaded with such information and rely on the user devices 142, 144 to supply subscriber information records on an as needed basis. This may be, and sometimes is, the case where set top boxes with limited memory and/or without a high speed data connection to the cable network headend are used. Such "legacy" devices have limited functionality but normally include IR or RF sensors which can receive signals from a user device such as a remote control. In at least some embodiments the IR sensor and/or RF sensor of a STB which lacks a high speed digital data connection with the cable network headend and the BM server 154 included therein, relies on the supply of subscriber and/or customer record information from user devices for implementing one or more services or features based on subscriber record information.

Thus, in some embodiments, the individual subscriber record 204, 227 or 228, corresponding to an individual service subscriber, and note merely a subscriber identifier, e.g., name 205, or number 206, is loaded, onto the user device 142 or 144 at the time of provisioning the service and/or in response to a user providing updated preference information to the network service provider or in response to a change in the services, e.g., premium channels, a customer and thus set of users corresponding to a customer premise contract to receive. Thus, user devices, in some embodiments, store the service subscriber record of the user or users to which the user device corresponds and communicates the information to a STB, e.g., when in the presence of the STB or in response to input from a user causing the user device to transmit the information. Depending on the type of user device, the downloading of the subscriber record may be performed wirelessly, e.g., over a wireless cellular data channel in the case of the user device being a cell phone and/or through the user device being coupled to a computer, e.g., a personal computer, of the user via a USB or other data connection and with the computer being supplied with the subscriber record to be stored.

While a user device is often used to store the subscriber record of a single user to which the user device corresponds, in some embodiments it stores and communicates an entire customer premise record to STBs with the user of the device at a given time having to enter a subscriber personal identification number (PIN) 251 which is sent to the STB or checked by the user device and allows the STB and/or user device to confirm which of a plurality of users corresponding to the customer premise record 202 stored in the user device is using the user device at a particular point in time.

Each of the subscriber records 204, 227, 228 includes information identifying the individual user/subscriber, e.g., a subscriber name 205, 305 and/or subscriber identifier 206, 306 information identifying the customer premise, e.g., a customer premise identifier 253, 353, a subscriber PIN 251, 351 which can be used in verifying an individual service subscriber and other service related information, e.g., channel program/viewing entitlement information 208, 308, parental control information 210, 310 which may include a list 212, 312 of program channels and/or content to be blocked and various user specific service related information including content sharing information 214 and program guide display preference information 224, 324. The subscriber records 204, 227 and 228 may also include subscriber identification signal information 209 which may include, e.g., encryption and/or decryption information, used in the generation and/or decrypting of received information corresponding to a subscriber. The encryption/decryption information adds a level of security enabling the subscriber and/or customer premise record to be communicated from a user device to a STB in a secure manner.

Content sharing information 214, 314 may, and in some embodiments does, include information relating to the sharing of premium program channels and/or content a service subscriber is entitled to share. A service subscriber may set the sharing information to allow/block sharing of some or all program content outside the customer premise to which the subscriber corresponds. For example, a subscriber can set the sharing information 214, 314 to allow sharing/viewing of premium sports/news channels and/or content and various channels indicated as subscriber favorites identifying the content/channels to be stored in element 216, 316. The subscriber content sharing information 214, 314 may also include share blocking information 218, 318 including a list of channels and/or content to be restricted, e.g., blocked, from being shared. For example, the information 218 may include a list of channels 220 which are to be blocked from being shared, and a list of content 219 which is to be blocked from being shared. The channel blocking/sharing information may also include information 222 identifying content/channels which are to be blocked from being shared as a result of one or more parental control restrictions, for example: block by time; block by title; block by rating, etcetera. The blocking information 222 may be a copy or the same as information 212 included in the parental control information.

User service preference information included in the subscriber record 204, 227, 228 may include, but is not limited to, program guide display preference information 224. This information may indicate the preferred display format of the program guide, e.g., whether the guide should be arranged according to program channel numbers or with the channels grouped according to the genre of the content provided by the program channels or some other criteria. Where a subscriber has generated one or more customized channel listings, the display format information may identify the customized channel listing and the program channels to be included therein when generating a program guide. As part of the program guide preference information, a subscriber can specify if they prefer to see all channels, including those which are not available to the subscriber or simply those channels which are available for viewing. As will be discussed further below, in a group context the number of channels available to a subscriber may be different than when the subscriber is alone and thus limited in the available channels to these which are to be made available by the customer agreement corresponding to the individual subscriber.

Figure 3:
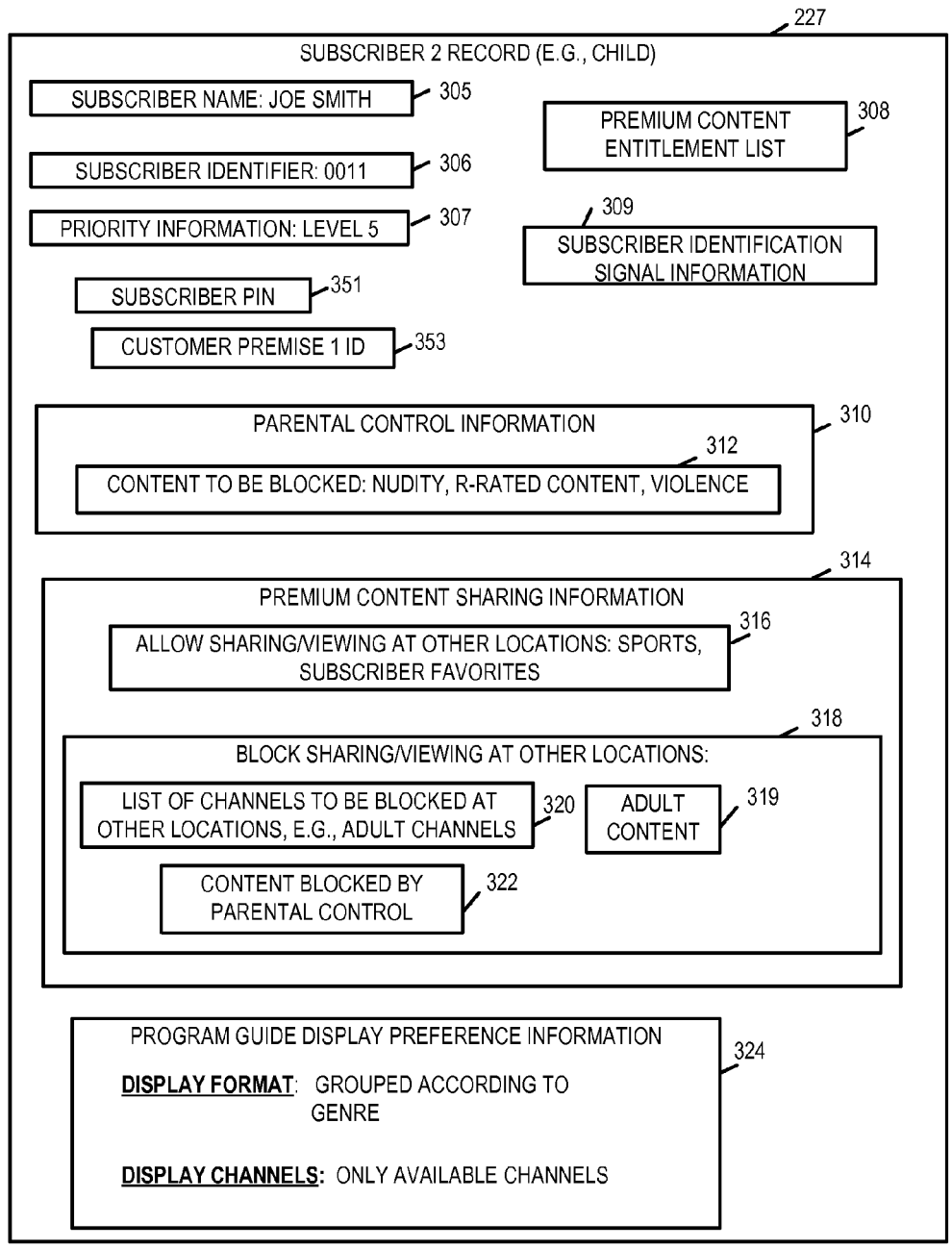
FIG. 3 illustrates a second subscriber record corresponding to customer premise record 1 shown in FIG. 2, said second subscriber record corresponding to a second service subscriber, e.g., a child, who corresponds to customer premise 1 in addition to subscriber 1, e.g., the parent whose subscriber record is shown as part of FIG. 2.

FIG. 2 shows the content of a first exemplary subscriber record 204 corresponding to the first customer premise record 202 in detail while FIG. 3 shows the exemplary content of the second subscriber record 227 corresponding to the same customer premise record 202 in a similar level of detail.

In the example shown in FIG. 2, the first subscriber record corresponds, e.g., to a parent in the household to which customer premise 1 corresponds. The first subscriber is identified in element 205 as John Smith and has a subscriber identifier number 0001 as indicated in element 206. Subscriber 1 also has a relatively high priority level of 10, as indicated in element 207, e.g., on a scale of 1 to 10 with 10 being a top priority at customer premise 1. The priority level information 207 is used in determining which preference and/or user configurations should be used when a group of multiple users is detected to be present, e.g., within the signal detection range, of a set top box as will be discussed further below. The subscriber PIN 251 is, in some embodiments, a number which can be entered by John Smith into the set top box and/or user device to indicate that he is present and/or to confirm that he is authorizing the override of a parental control restriction, e.g., content blocking, being imposed because of the detected presence of a user subject to a parental control restriction not applicable to the first subscriber. For example, when presentation of adult content is automatically paused or stopped because of entry of a subscriber such as subscriber 2 into the detection area of the STB controlling the presentation of adult content, subscriber 1 can enter his PIN and control the STB to resume presentation of the adult content. Thus, in at least some such embodiments, a STB requires entry of a PIN corresponding to a detected subscriber/user authorized to view content which is being blocked due to the detected presence of a user subject to a parental control restriction before the content can be viewed and/or content presentation resumed.

The customer premise ID 253 in subscriber record 1 204 indicates that the subscriber corresponds to customer premise location 1 as do the other subscribers for which information is included in customer premise 1 record 202. The customer premise identifier allows the STB to easily determine if detected users, as indicated by the detection of user devices corresponding to the individual users, correspond to the customer premise where the STB is located or a different customer premise location. Such information can, and is, used in some embodiments in determining which user's service preference information should control the service or services provided by a STB when a group of users are detected to be in proximity of the STB.

Not that since John Smith is an adult and, in this example, the head of the household corresponding to customer premise 1, the parental control information indicates that no channels and/or content should be blocked. However, for purposes of the example, it is assumed that the premium content entitlement list 208 includes one or more adult content channels, premium sports channels and premium news channels which are to be provided to customer premise 1 in accordance with a service agreement. In the example shown in FIG. 2, the first subscriber has set the premium content sharing information 214 to allow sharing as indicated by information 216, e.g., viewing, of sports, news and various subscriber at locations outside customer premise 1 but has blocked from sharing the adult channels included in list 220 and has blocked the sharing of adult content as indicated by information 219 regardless of the channel it appears on. The parental control information 210 indicates that no content is to be blocked based on parental control restrictions, the content which is to be blocked from being shared as indicated by information 222 will be none.

With the content sharing information 214 provides information about the sharing settings which have been set by subscriber 1, the program guide preference information 224 indicated that the program guide should be displayed as a list of program channels arranged according to channel number order as indicated by the display format information with all channels being displayed, e.g., including those which are unavailable since as a result to a service agreement restriction or for some other reason, as indicated by the channels to be displayed information.

FIG. 3 illustrates a second subscriber record 227 corresponding to customer premise record 1 shown in FIG. 2, said second subscriber record corresponding to a second service subscriber, e.g., a child, who corresponds to customer premise 1 in addition to subscriber 1, e.g., the parent whose subscriber record is shown as part of FIG. 2. The general nature and information content of many of the information fields in subscriber record 227 have already been described and thus will not be described in detail again. Note however that exemplary subscriber record 227 corresponds to a child who corresponds to customer premise 1. Accordingly, unlike in subscriber record 204 where the parental control information indicated that no channels were to be blocks, parental control information 310 indicates that channels and/or content which provide programs and/or content showing adult content, e.g., nudity, R-Rated content, and violence should be blocked from viewing by the subscriber corresponding to the subscriber record 227. Note also that the priority level of the subscriber indicated in information element 307 is 5 which is a lower priority than that indicated for the parent in information field 207. Thus, if the parent corresponding to subscriber record 204 and child corresponding to subscriber record 227 are detected to be in proximity of a set top box, the parents service and preference settings will take priority over those of the child. Thus, while the child has set his preferred guide display format to result in a program guide showing channels listed according to genre, if the child and parent are detected to be present in the same room, the parents preferred channel number program ordering will automatically be given preference since subscriber 1 has a higher priority than subscriber 2.

Since subscriber 2 is subject to parental control restrictions, the channels and/or content which are blocked from being viewed by subscriber 2 will also be automatically blocked from being shared with information 322 indicating the same content to be blocked from sharing as the content indicated in element 312 which is to be blocked from viewing.

While subscriber records 204, 227 correspond to the first customer premise record 202, it should be appreciated that similar subscriber records are maintained in the cable network headend and are available for service subscriber's corresponding to other customer premise locations from the headed or from user devices corresponding to individual subscribers.

The methods and apparatus of the present invention can be used with a wide variety of devices. Customer premise devices which can receive and use subscriber record information such as those shown in FIGS. 2 and 3 can be implemented as standalone set top boxes and/or set top box implemented as an integral part of a television or other device.

Figure 4:
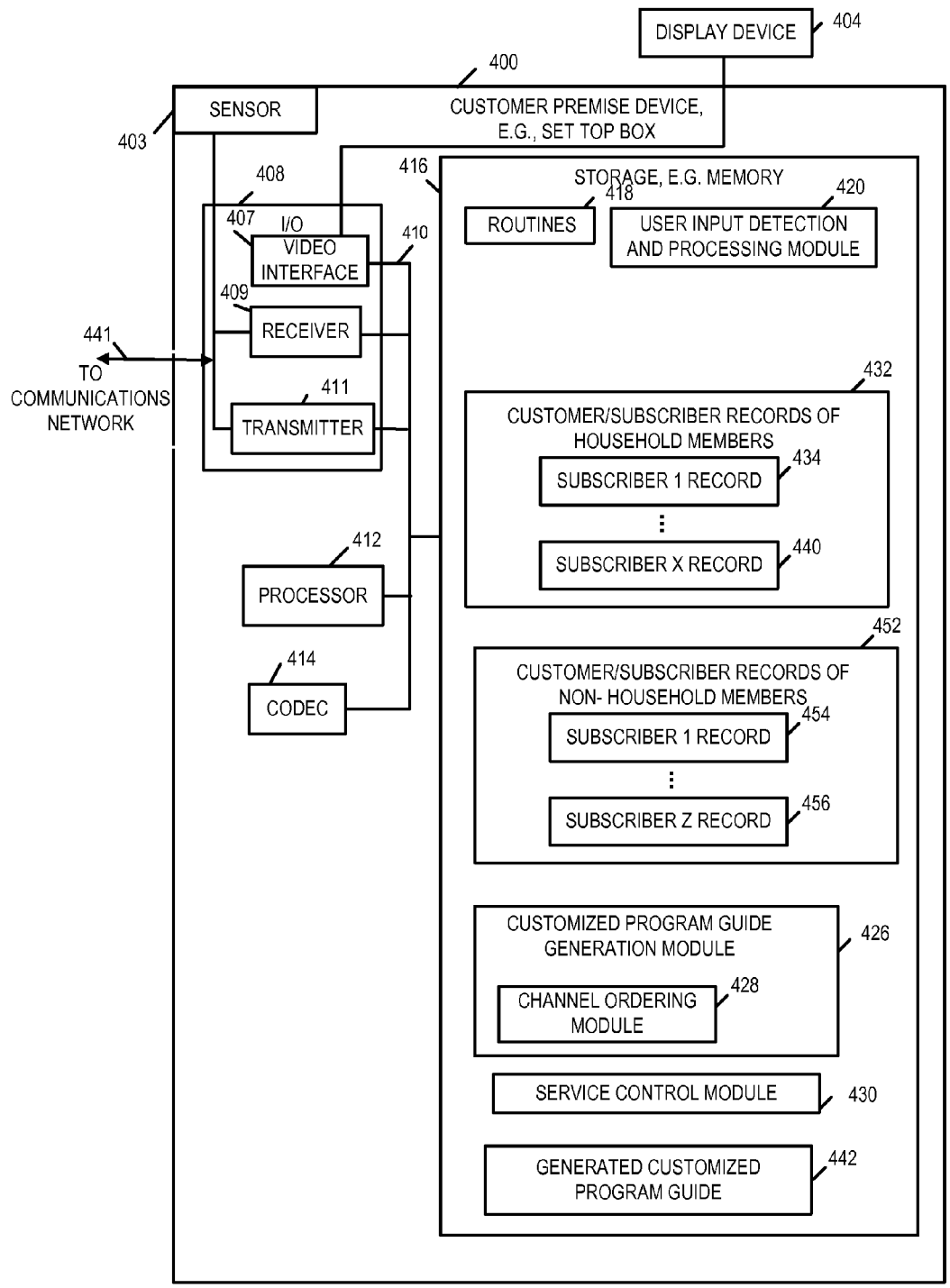
FIG. 4 illustrates a set top box including a sensor and a display device coupled to the set top box which may be used in the system of FIG. 1.

FIG. 4 illustrates a customer premise device 400 which can be used in the system of FIG. 1. Exemplary customer premise device 400, e.g., a set top box, coupled to an external display device 404 such as a television or monitor. The set top box 400 includes a sensor 403 for receiving IR signals, a receiver 409 and a transmitter 411. The output of the sensor 403 is coupled to the input of the receiver 409. The receiver 409 is capable of receiving and processing signals from the sensor 403, communications network connection, e.g., cable 441, and/or is capable of receiving wireless (RF) signals transmitted over the air. The transmitter 411 may include a cable modem, wireless transmitter and/or IR transmitter allowing the customer premise device to communicate with the cable network headend via communications network connection 441 and to user devices via wireless signals. Via the receiver 409 the set top box 400 can receive subscriber record(s) from user devices as well as input from a user, e.g., a PIN, and/or signals indicating user selection of one or more service options or control selections.

The device 400 further includes an input/output (I/O) module 408, which includes the receiver 409, transmitter 411 and a video interface 407, which are coupled to a processor 412, coder/decoder (CODEC) 414 and storage, e.g., memory 416, via a bus 410. The CODEC 414 supports coding/decoding of video and/or audio content which can be output to the display device 404 which, in some embodiments also includes an audio output device.

The processor 412, under control of one or more routines in the memory 416, controls the set top box 400 to operate in accordance with the invention. Memory 416 includes both routines, e.g., modules, including executable instructions, and data which is used by the routines. For example, memory 416 includes a user input detection and processing module 420 for processing signals from a user, e.g., entered either directly into the set top box by an input device included therein or supplied via the sensor 403 from a remote control or other user device. In addition, the memory includes a customized program guide generation module 426, a service control module 430 and various other routines 418. Program guide generation module 426 includes a channel ordering module 428 for arranging program channels according to channel number, genre grouping or some other user specified order which may be indicated in user preference information included in the subscriber record which is used to control the program guide generation process at a particular point in time.

Figure 5:
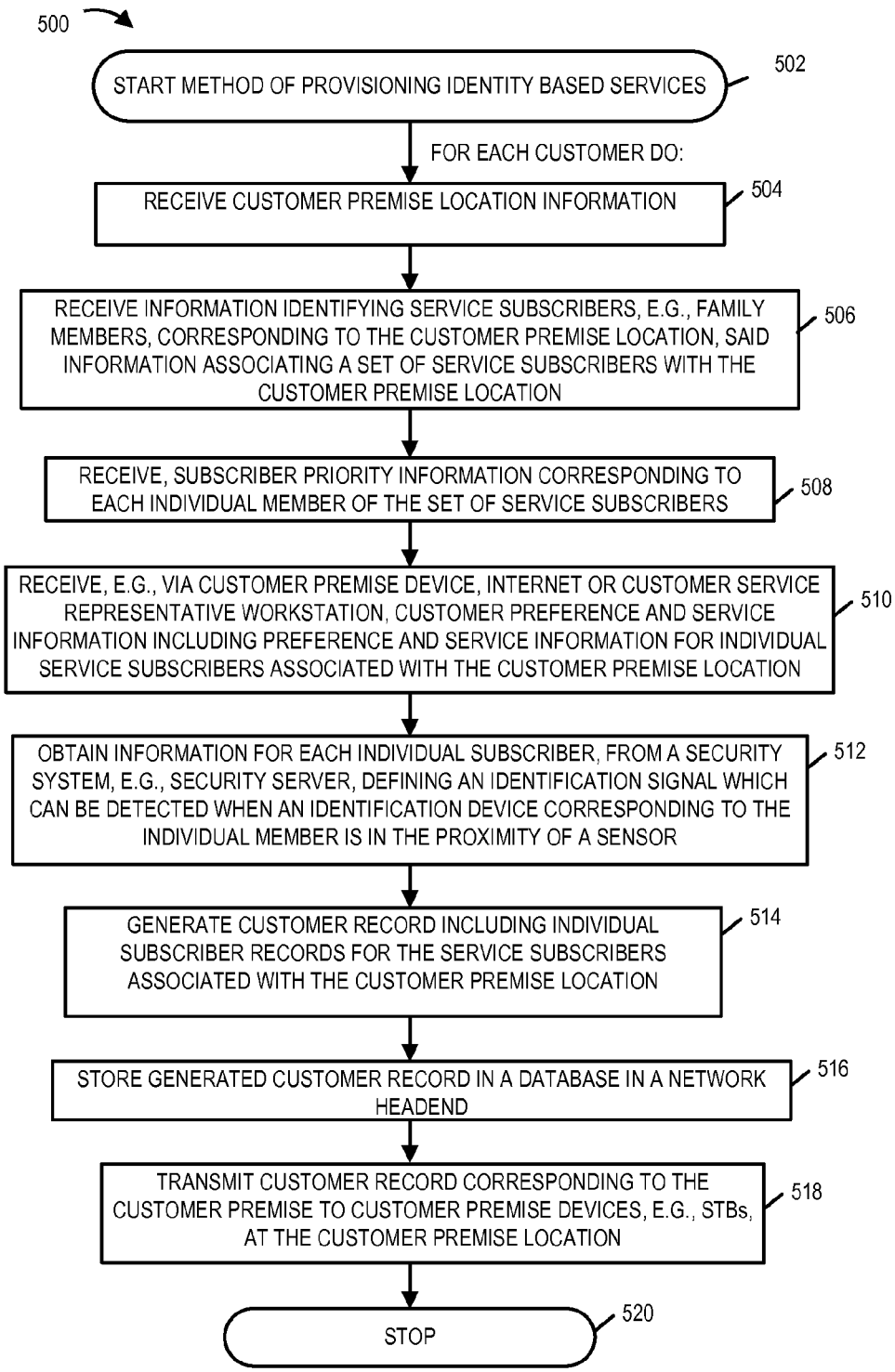
FIG. 5 illustrates a method, which can be used in the system of FIG. 1, for provisioning an identity based service which involves the generation, storage, and/or distribution of a subscriber and/or customer record.

The routines 418 include one or more routines such as those shown in FIGS. 5 and 6 and include various subroutines. The routines 418 may, and in some embodiments do, include a separate module for implementing each of the separate steps of the flow charts/methods shown in FIGS. 5 and 6 which will be discussed in detail below.

The memory includes customer record information 432 that includes subscriber records 434-440 corresponding to one or more members of the household, e.g., customer premise, where the set top box 400 is located. The customer records 343-440 may be preloaded by the BMS server located in the cable headend and/or loaded from one or more user devices corresponding to members of the household as the devices signal the corresponding subscriber's presence and supply the corresponding subscriber record via a wireless or infrared signal.

In addition to records of household members, the memory includes customer and/or subscriber records 452 corresponding to non-household members. As shown, the information includes subscriber 1 record 454 and subscriber Z record 456. Subscriber records 454, 456 of non-household members are deleted after a predetermined time, e.g., 5 minutes, 10 minutes or a half hour, during which the set top box 400 fails to detect a signal indicating the subscriber's presence in the proximity of the set top box. In some embodiments household member records are also deleted after a predetermined time of failing to detect a signal from a user device indicating the presence of the household member. In some embodiment the time which must pass without detection of a signal indicating a household member is not present is longer, e.g., at least twice as long as the time required to pass before deletion of the subscriber record corresponding to a non-household member. In some embodiments household member subscriber records are retained for one or more days without detection of a signal from the subscriber while non-household members are detected within minutes or hours of failing to detect a signal corresponding to the non-household member's user device.

The content of the customer and/or subscriber records stored in the set top box 400 may be the same as or similar to the subscriber record information described with regard to FIG. 2 and/or FIG. 3.

A subscriber may update subscriber information via the set top box in which case the updated subscriber record is communicated to the user's device and/or the head end so that the information stored in an the subscriber record corresponding to an individual is consistent throughout the system 100 regardless of the device in which it is stored.

FIG. 5 is a flowchart 500 illustrating a method, which can be used in the system of FIG. 1, for provisioning an identity based service which involves the generation, storage, and/or distribution of a subscriber and/or customer record. The method 500 may be implemented by a set top box such as shown in FIG. 4 or by the business management server 154 of FIG. 1.

Operation for provisioning identity based services starts in step 502. Various steps 504 through 518 may be, and in some embodiments are, implemented for each customer, e.g., service subscriber.

In step 504 customer premise location information is received, e.g., at the cable network headend 102. The customer premise location may be received at the headed 102, e.g., via the customer premise device such as STB or via internet or through a customer service representative workstation. Thus the customer can send the information in various different ways. The customer premise location information may, and in some embodiments does, include a customer premise identifier, e.g., household identifier, associated with a primary account holder, to the network headend 102, and a physical address or location corresponding to the primary account holder/service subscriber.

Operation proceeds from step 504 to step 506 where information identifying service subscribers, e.g., family members, corresponding to the customer premise location, the information associating a set of service subscribers with the customer premise location. Thus the information associating a set of service subscribers with the customer premise location is received at the headend 102.

Operation proceeds in step 508, subscriber priority information corresponding to each individual member of the set of service subscribers is received. The information may be received via a set top box interface, user device interface, via the Internet and/or entered by a cable network system operation who receives the information via a telephone call. The priority information corresponding to an individual member indicates a level of priority associated with that member. For example, a primary account holder/head of household may have the priority level, e.g., level 10, while a child may have a lower priority level.

Operation proceeds from step 508 to step 510. In step 510 customer preference and service information including preferences, e.g., customer settings, and service information for individual service subscribers associated with the customer premise location, is received, e.g., via the customer premise device (STB), internet or customer service representative (CSR) workstation. Thus the individual subscribers may provide the preferences and service related information through the STB device, or through the internet, e.g., by visiting the service provider website and entering the information, or by calling a CSR and providing the information to the CSR.

Operation proceeds from step 510 to step 512. In step 512 the network headend 102 obtains information for each individual subscriber from a security system, e.g., security server, defining an identification signal which can be detected when an identification device, e.g., an RFID chip, corresponding to each of the individual subscriber members, is in the proximity of a sensor, e.g., such as sensor 403.

Operation proceeds from step 512 to step 514. In step 514 a customer record including individual subscriber (e.g., household member) records for the service subscribers associated with the customer premise location is generated, e.g., based on the information collected in steps 504 through 512. An exemplary subscriber records are illustrated in FIGS. 2 and 3.

Next in step 516 the generated customer record is stored in the network headend 102. In some embodiments, customer records corresponding to various customers are stored in a customer record database, e.g., database 146. Operation proceeds from step 516 to step 518. In step 518 customer record corresponding to the customer premise is transmitted to the customer premise devices, e.g., set top boxes at the customer premise location. Thus the headend 102 communicates the customer record to the STB devices at the customer's premise and the STBs may store the customer record for implementing various features in accordance with the invention.

FIG. 6, which comprises the combination of FIGS. 6A-6D, illustrates a method 600 including various subroutines, for operating a set top box or system to provide customized services to one or more service subscribers. Operation starts in step 602 where a customer premise device, e.g., a set top box, such as STB 400, implementing the method 600 is powered on and initialized.

Operation proceeds from start step 602 to steps 604 and 606 which may be performed asynchronously in parallel. In step 604 the STB detects presence of one or more subscribers in the proximity. It should be appreciated that in various embodiments the presence of various subscribers is detected when a sensor associated with the STB device, e.g., sensor 403, detects identification signals transmitted by a device, e.g., an RFID device, corresponding to the detected subscribers. Operation proceeds from step 604 to step 607.

In step 606, which is performed on an on-going basis in some embodiments, the STB performs a customer record update operation, e.g., when relevant update information is provided to the STB, e.g., by an individual subscriber member. The update information may include, e.g., updating priority level corresponding to a subscriber, changing/editing preferences, parental controls, adding new subscriber member corresponding to a customer premise location etc. The customer record update operation is performed by executing the customer record update subroutines illustrated in FIG. 6D.

Returning to step 607. In step 607 the STB accesses customer records corresponding to the detected one or more subscribers to access subscriber preference and service information corresponding to each of the detected service subscribers. In some embodiments step 608 and one or more of steps 610, 612 and 614 are performed as part of step 607. In step 608 the STB determines whether or not the subscriber record corresponding to the detected service subscribers is stored locally, e.g., in the STB device. If it is determined that the subscribers records corresponding to the detected subscribers are available and stored locally, the operation proceeds to step 616. I it is determined that the subscriber records corresponding to the detected subscribers are not stored locally, then the operation proceeds from step 608 to step 610.

In step 610 the STB sends a request, to the service provider system, e.g., network headend 102, for subscriber preference and service information corresponding to the detected subscribers. In step 612, in response to the request for information, the STB receives the preference and service information included in the individual subscriber records corresponding to the detected subscribers, from the network headend 102, thus providing the STB with subscriber specific settings and preferences to allow the STB to provide service at the customer premise location in accordance with the preferences of the detected subscribers. In step 614 the STB stores the received preference and service information corresponding to the detected subscribers in the memory. Operation proceeds from step 614 to step 616.

Returning to step 616. In step 616 the STB determines, from the stored information, e.g., subscriber record including preference and service information, subscriber customized settings associated with the service subscribers detected in the proximity of the STB. Thus the STB checks the individual subscriber records to determine the preference and service information corresponding to each of the detected subscribers.

Operation proceeds from step 616 to step 618. In step 618 the STB determines one or more service related features based on priority information of subscribers who are detected to be in proximity to the STB. As discussed in detail earlier, the subscriber records include preferences, priority information, parental controls and other information for the subscriber to which the record corresponds. In some embodiments the priority information corresponding to the detected subscribers is checked to ensure that the STB provides at least one service feature in accordance with a subscriber customized setting corresponding to the detected service subscriber having the highest priority, e.g., provide customized program guide in a display format, e.g., customized program channel listing configured in accordance with the subscriber customized settings corresponding to the detected subscriber with highest priority level.

Operation proceeds from step 618 to step 620. In step 620 a user input indicating a service to be provided is received. The user input may be received, e.g., in the form of a signal from the user remote control. Operation proceeds from step 620 to step 622.

In step 622 a service is provided to the detected subscriber (s) via the customer premise device, e.g., the STB, in accordance with the preference and service information corresponding to the one or more detected service subscriber(s). In various embodiments, as part of providing service, to the detected subscriber(s) in accordance with the preference and service information corresponding to the detected service subscriber(s), one or more of steps (subroutines) 624, 626 and 628 are implemented.

If the user input signal detected in step 620 is a signal indicating that the subscriber has requested to view a program guide, then STB implements step 624 and the program guide subroutine is performed. The program guide subroutine is illustrated in FIG. 6B.

If the user input signal detected in step 620 is a signal indicating that the subscriber has requested a channel access, e.g., by selecting a channel to view, then STB implements step 626 and the channel access subroutine is performed. The channel access subroutine is illustrated in FIG. 6C. If the user input signal detected in step 620 is a signal indicating that the subscriber wants to access some stored content, e.g., subscribers recordings, then STB implements step 628 and the channel stored content access subroutine is executed. Execution of a stored access content subroutine involves determining whether the user requesting access is a customer corresponding to the customer premise at which the STB implementing the method is located or a service subscriber corresponding to another customer premise, e.g., is a guest or visitor. The subscriber requesting the access to the stored content is provided access to his/her record programs if the subscriber is a customer corresponding to the customer presence at which the STB implementing the method is located in a normal manner. However, if the subscriber requesting access to stored content is a guest or visitor, the access to the subscriber's stored content is constrained based on any stored content sharing settings or other content sharing settings the subscriber may have set in his/her subscriber service profile. For example if adult content was not to be shared, recordings of adult content, while part of a subscriber's recorded content, would not appear or be made available at another customer premise which is not the subscriber's home customer premise. Thus, subscriber's are provided remote access to stored content, e.g., content maintained in the network headend or which can be retrieved from a STB at their home via the cable network while away from home but subject to the content sharing/access restrictions which are set by the user. In this way, the user is not embarrassed while visiting a friend or neighbor and can feel free to access their stored digital video recorder content from their neighbors or friends house without the neighbor or friend seeing the full list of stored content which may include personal content in some cases.

Arrow 629 is used to represent that the receipt of user related signals and the detection of the presence of one or more users, e.g., based on signals from user devices continues over time. Thus services will be provided in response to received signals and customer presence/subscriber record information will continue on an ongoing basis and does not end with a service being provided in step 622.

Figure 6A:
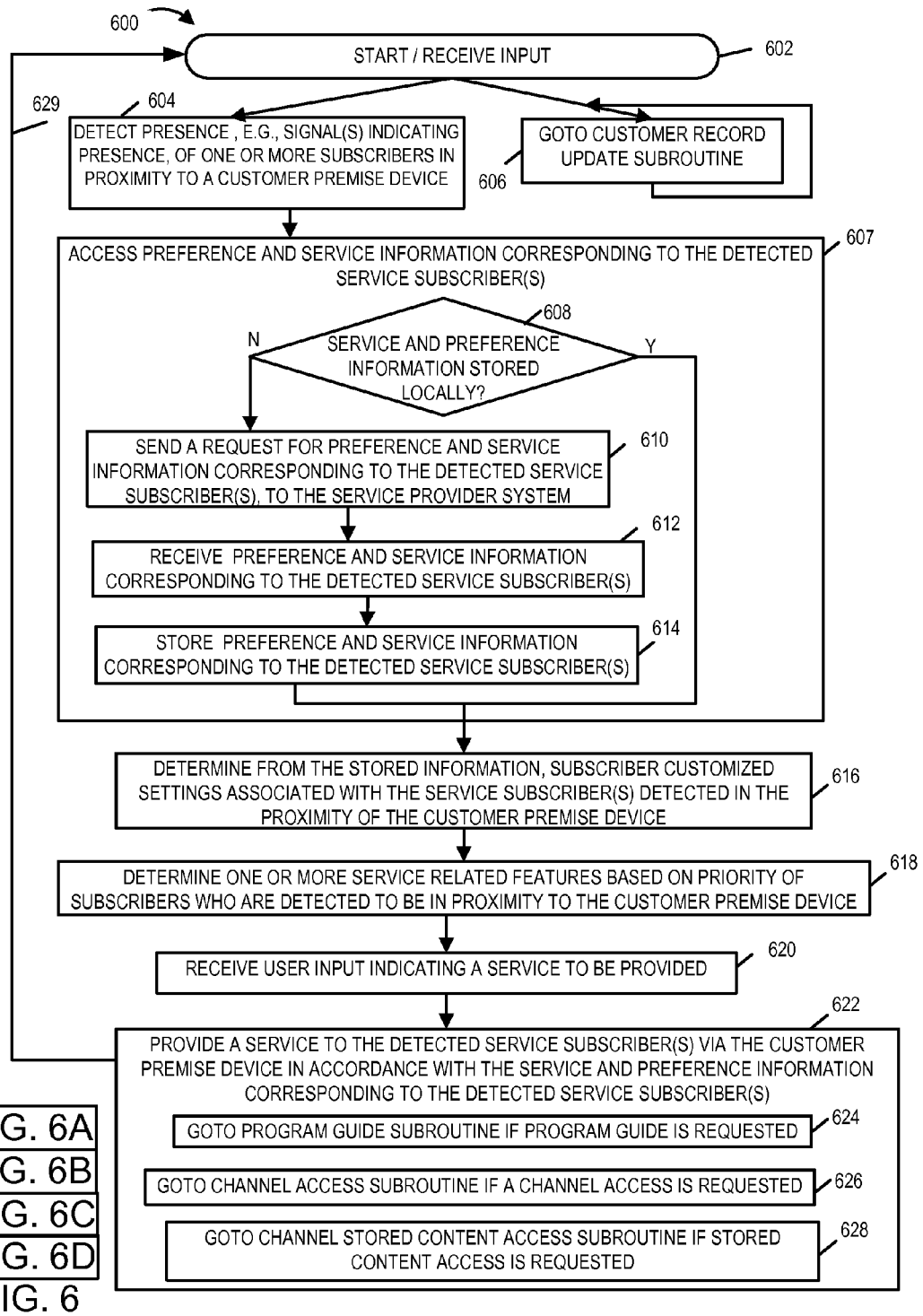
FIG. 6, which comprises the combination of FIGS. 6A-6D, illustrates a method including various subroutines, for operating a set top box or system to provide customized services to one or more service subscribers.
Figure 6B:
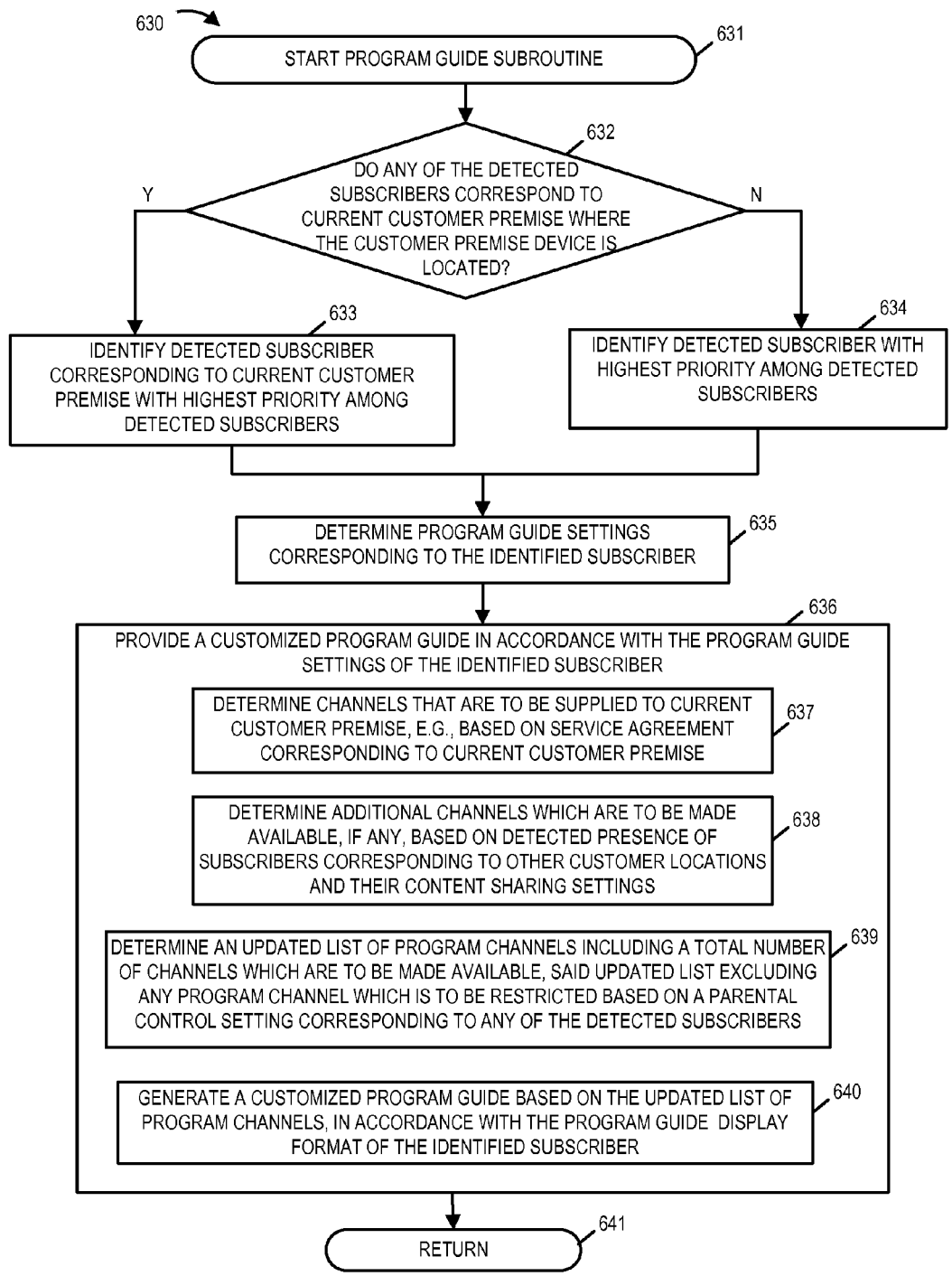
Figure 6C:
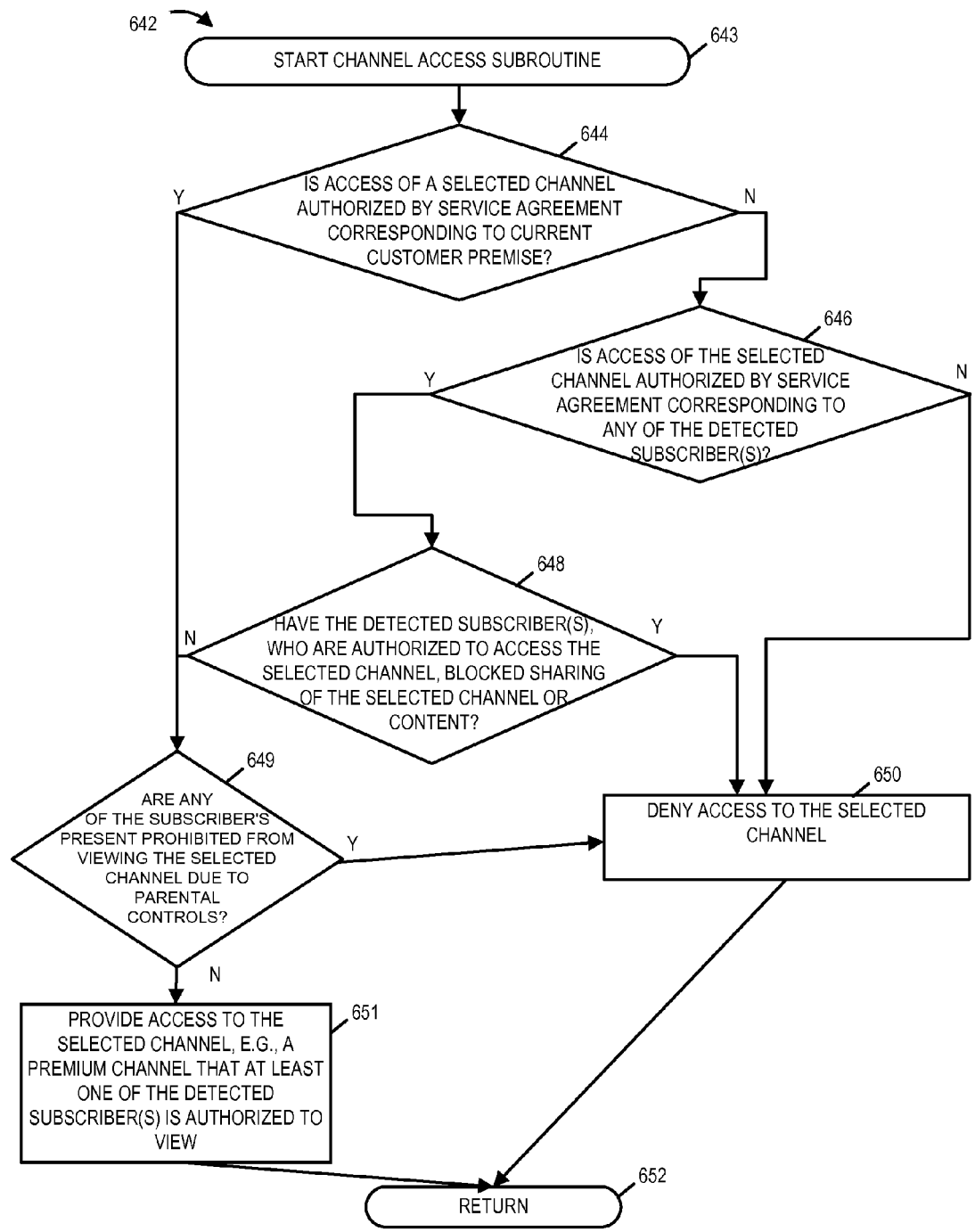

Referring now to FIG. 6B that illustrates drawing 630 showing various steps performed in implementing the program guide subroutine 630. In step 631 the STB starts the program guide subroutine. Operation proceeds from start step 631 to step 632. In step 632 it is determined whether any of the detected subscribers correspond to current customer premise location where the STB is located, e.g., determine if, among the detected subscribers, there are any family members associated with the customer premise, e.g., members of the household where the STB is located. The detected subscribers may include subscribers associated with the customer premise, e.g., family members, and one or more other subscribers, e.g., visitors, friends, neighbors etc.

If it is determined that there is at least one detected subscriber corresponding to the current customer premise where the STB is located, the operation proceeds from 632 to step 633, otherwise the operation proceeds to step 634.

In step 633 the STB identifies detected subscriber corresponding to current customer premise with highest priority among detected subscribers. Thus the STB identifies, out of the detected subscribers, the subscriber with highest priority level that belongs to the customer premise, e.g., identifies the family member with the highest priority level out of those who have been detected. It should be appreciated that in accordance with one feature, in some embodiments, preference is given to the subscribers corresponding to current customer premise over other detected subscribers. Operation proceeds from step 633 to step 635.

When it is determined that there is no detected subscriber corresponding to the current customer premise where the STB is located, then in step 634 the STB identifies a subscriber, out of the detected subscribers, with highest priority among detected subscribers. Operation proceeds from step 634 to step 635.

Following identification of the subscriber with the highest priority, in step 635 the STB determines the program guide settings corresponding to the identified subscriber. In various embodiments the STB checks the identified subscriber's record to determine the preferred settings for the program guide. Operation proceeds from step 635 to step 636.

In step 636 the STB provides a customized program guide in accordance with the program guide settings of the identified subscriber. In various embodiments, as part of implementing step 636, one or more of steps 637, 638, 639 and 640, are performed. In step 637, the channels that are to be supplied to the current customer premise, e.g., based on the contract/service agreement corresponding to the customer premise, are determined. These channels may be, e.g., a set of channels included in the service package that the subscriber has signed up for with the service provider.

In step 638 the STB determines additional channels which are to be made available, if any, based on the detected presence of other subscribers, e.g., subscribers corresponding to other premises and their content sharing settings. Thus it should be appreciated that additional channels may be made available at the customer premise where the STB is located, due to the presence of other subscribers, e.g., friends, visitors, corresponding to other customer locations, and their sharing preferences, e.g., whether or nor they have enabled sharing of their subscribed channels with others.

In step 639 the STB determines an updated list of channels including a total number of channels which are to be made available (e.g., based on the determination in steps 637 and 638), the updated list of channels excluding any program channel which is to be restricted based on a parental control setting corresponding to any of the detected subscribers. Thus it should be appreciated that while more channels may be made available due to the presence of other subscribers if their content sharing permits, various channels and/or content may also be restricted due to the presence of other subscribers because of the parental control restrictions corresponding to the detected subscribers.

In step 640 the STB generates a customized program guide based on the updated list of channels which are to be made available, in accordance with the program guide display format preferred by the identified subscriber, e.g., with channel listings arranged by channel number, or arranged according to genre etc., as preferred by the identified subscriber.

Referring now to FIG. 6C which illustrates drawing 642 showing various steps performed in implementing a channel access subroutine. In step 643 the STB starts the channel access subroutine. Operation proceeds from start step 643 to step 644. In step 644 it is determined whether the access of a user selected channel is authorized by service agreement/contract corresponding to the current customer premise. If it is determined that the channel access is authorized based on the service agreement corresponding to the customer premise where the STB is located operation proceeds to step 649. However, if channel access is not permitted based on the subscriber service agreement corresponding to the customer premise, operation proceeds to step 646 to check if the access may be permitted because of access privileges corresponding to a detected user, e.g., service subscriber, corresponding to a different customer premise. Thus, step 646 corresponds to a check to see if a guest is sharing privilege to access a channel or content which would normally be blocked. In step 646 if it determined that access of the selected channel is authorized by a service agreement corresponding to any of the detected subscriber(s), e.g., users in proximity of the STB, then operation proceeds to step 648 otherwise operation proceeds to step 650. The determination of whether one or more user's is authorized to access the channel can be determined from the content entitlement list 208 in the subscriber record, which in some embodiments lists premium as well as non-premium content, e.g., channels and shows, which a user is entitled to access based on the service agreement corresponding to the user.

In step 648 a determination is made as to whether or not the detected subscriber(s) who are authorized to access the selected channel have blocked sharing of the selected channel or its content. This determination is made by checking the channel/content sharing settings of the individual users as indicated in their subscriber records to determine if their settings indicate that the content/channel should not be shared. If at least one subscriber who's presence has been detected who is entitled to access the selected channel has not set the channel/content to be blocked, sharing and thus access to the channel will be permitted based on the subscriber's presence and authorization to share access to the channel and operation will proceed from step 648 to step 649. Otherwise operation will proceed from step 648 to step 650. Thus, if there are two house guests, both with the right to access the selected channel from home, and one has sharing of the selected channel authorized, i.e., not blocked, then sharing is permitted. Thus, a group's access to channels tends to increase the more users are present in the group even if a few of the users have restricted sharing of some channels since some of the other users many not have blocked sharing of the channel(s).

By the time the process reaches step 649, it has been determined based on channel and/or content access privilege information and/or sharing information that the set top box is permitted to access the selected channel. However, a parental rights check is still to be satisfied in step 649 before access to the selected channel is provided.

In step 649, the STB determines if any of the subscribers present are prohibited from viewing the selected channel and/or selected content due to parental control settings, e.g., reflected in the subscriber records corresponding to the subscribers who's presence was detected. If any one of the subscribers who are present is prohibited from viewing the selected channel/content, operation proceeds to step 650 and access to the content is denied. Otherwise operation proceeds from step 649 to step 651 and access to the selected channel is provided, e.g., the content corresponding to the selected channel is decoded and output to the display device for display.

In some embodiments, when a program or channel is determined to be restricted from display because of the presence of one or more subscribers subject to viewing restrictions, the STB presents an opportunity for one of the other subscribers present with authorization to access the channel to override the parental rights restriction by entering their PIN via their user device. Upon detection of a PIN from an authorized user entitled to access the selected content, in some embodiments, the parental control restriction will be overridden and the selected channel will be displayed.

Operation proceeds from steps 651 and 650 to return step 652 with control of STB returning to the place in the main routine from which subroutine 642 was called.

Figure 6D:
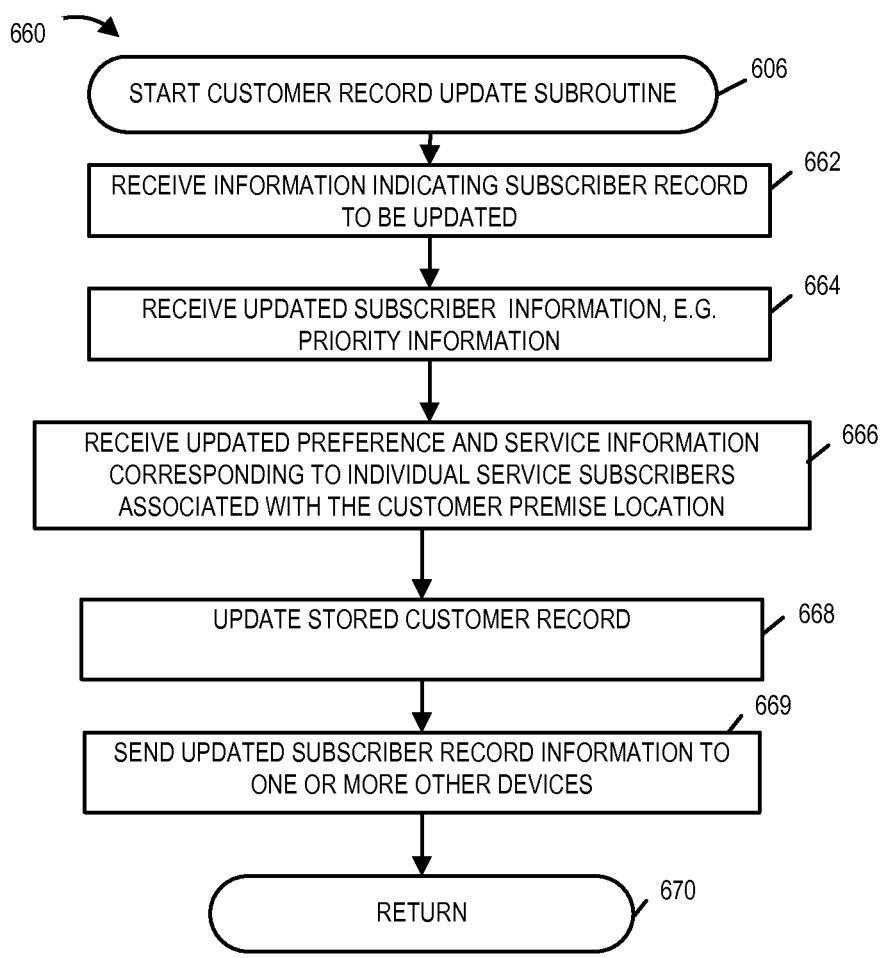

FIG. 6D illustrates a customer service update routine 660 which is called when the STB detects that a user is supplying updated subscriber record information which is to be stored and, depending on the embodiment, distributed to other devices in the system. Service update routine 660 may be called from step 606 of the main routine shown in FIG. 6A.

Routine 660 starts in step 606. Then, in step 662, information identifying the subscriber record to be updated is received and processed. This information may be, e.g., the subscriber identifier number corresponding to the subscriber and which can, and in some embodiments is, used to identify a particular subscriber record. The update process may also include receiving updated subscriber information such as priority information as shown in step 662 and/or updated preference and service information corresponding to the identified service subscriber as indicated in step 666. In step 668 the subscriber record stored in the STB implementing the method is updated with the received subscriber record information. In some embodiments, the STB also distributes the updated subscriber record to other devices in the system, e.g., devices other than the device which provided the information. For example, if the updated subscriber record information was received from the network headend, the STB would send, in step 669, the updated subscriber record information to the user device corresponding to the identified subscriber. However, if the updated subscriber record information was provided to the STB from the user device corresponding to the identified subscriber, the updated subscriber record information would be sent to the BM server 154 for storage in the customer premise record. Thus, the subscriber record information stored in various locations in the system 100 may be keep uniform with the devices updating one another as they receive updated information and/or a user changes preference information in his/her subscriber record. Operation returns from subroutine 660 to the main routine via step 670 after the update of a subscriber record has been completed.

Figure 7:
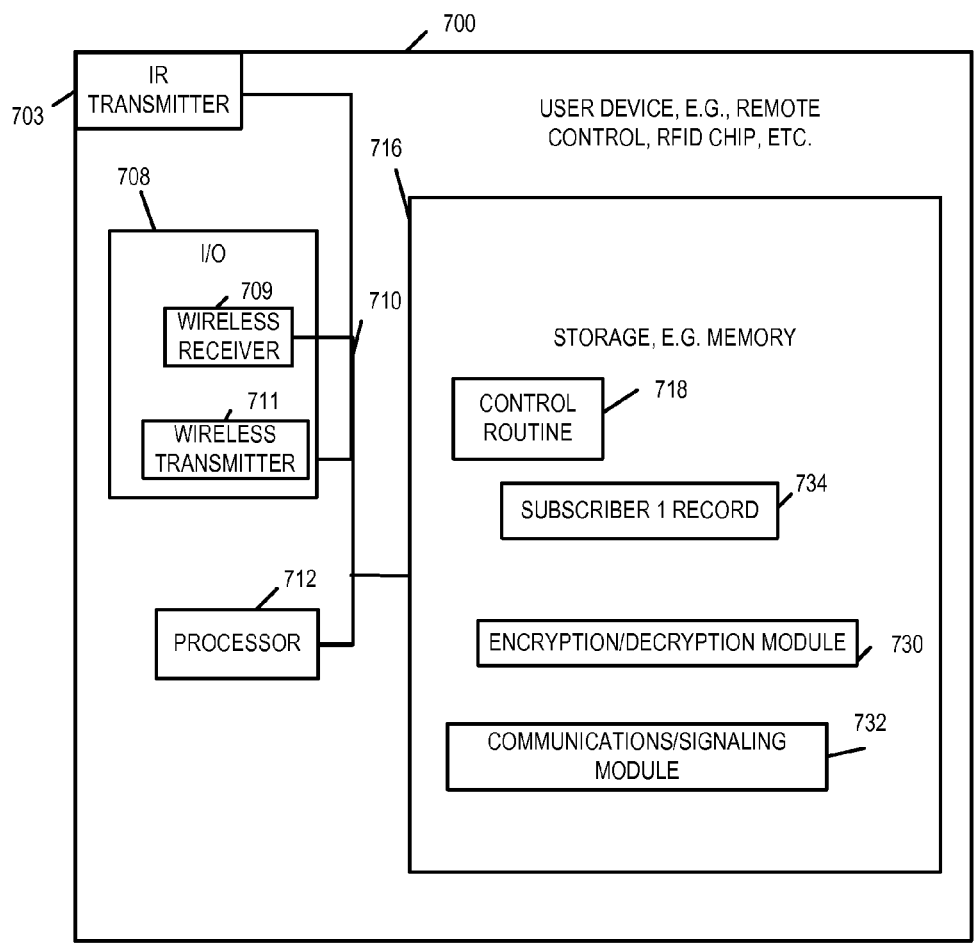
FIG. 7 illustrates a portable, e.g., mobile user device, which may be used as a user device of the system shown in FIG. 1 and which is capable of storing and transmitting a service subscriber identifier and/or one or more service subscriber records to a set top box.

FIG. 7 illustrates an exemplary portable, e.g., mobile, user device 700 which may be used as any one of the user devices 142, 144 of the system shown in FIG. 1 and which is capable of storing and transmitting a service subscriber record corresponding to an individual service subscriber of the type shown in FIGS. 2 and 3 to a set top box. The user device 700 may be a remote control, cell phone, WiFi enabled device such as a table device, a cell phone, an RFID device or it may take any one of a number of forms.

The device 700 includes an IR transmitted 703, wireless receive 709, wireless transmitter 711, processor 712 and memory 716 which are coupled together as shown in FIG. 7. Bus 710 coupled the processor to the I/O devices included in interface module 708 and to the IR transmitter 703. Receiver 709 and transmitter 711 may be implemented as wireless Radio Frequency (RF) devices such as WiFi, BlueTooth, and/or cellular devices. The memory 716 includes a control routine 718 which controls the user device 700, when executed by the processor 712, to operate in accordance with the invention including receiving and storing subscriber record information in subscriber record 734 and transmitting the subscriber record information 734 when in proximity to a set top box via the infrared (IR) transmitter 703 or wireless transmitter 711. The encryption/decryption module 730 can be used for decrypting received subscriber record information and for encrypting the information prior to transmission thereby maintaining the security of the information by allowing it to be communicated in encrypted form. Communications/Signaling module 732 controls, in some embodiments, the generation of signals to be transmitted and the interpretation of signals which are received, e.g., with the communications signaling module 732 working in combination with module 730 which performs encryption/decryption operations on an as needed basis.

The subscriber record 734 may, and in some embodiments does, include the same information as that which is included in the corresponding subscriber record maintained in the headend. The subscriber record 734 may include, e.g., the information included in subscriber record 204 as well as information identify the customer premise and/or customer record 202 to which the subscriber record stored in the user device corresponds. In some embodiments the customer premise and/or customer record identifier is included within each of the subscriber records corresponding to a customer record.

By storing the subscriber record in the user device and providing it to a STB 118 on an as needed basis, a STB 118 has ready access to the subscriber record and information included therein avoiding the need, in many cases, for the STB 118 to request subscriber record information from the network headend or to be preloaded with such information.

In various embodiments, system elements described herein are implemented using one or more modules which are used to perform the steps corresponding to one or more methods of the present invention, for example, presenting, e.g., displaying a genre arranged program guide to the user, receiving a user input signal requesting display of a genre arranged program guide, receiving a scroll control signal, detecting a change in the genre of program listings being displayed, decreasing and/or increasing the scrolling rate, etc. Each step may be performed by one or more different software instructions executed by a computer processor, e.g., a central processing unit (CPU). In some embodiments the modules may be and are implemented in software. In some embodiments the modules may be, and are implemented in hardware, e.g., as circuits. In some embodiments the modules may be, and are, implemented in a combination of hardware and software.

At least one system implemented in accordance with the present invention includes a means for implementing each of the various steps which are part of the methods of the present invention. Each means may be, e.g., an instruction, processor, hardware circuit and/or combination of elements used to implement a described step. Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow. Such variations are to be considered within the scope of the invention.

What is claimed is:

1. A method of providing services, the method comprising:
operating a customer premise device located at a customer premise to detect one or more service subscribers in proximity to the customer premise device;
identifying a highest priority detected subscriber in proximity to the customer premise device by i) identifying, as the highest priority detected subscriber, a detected subscriber corresponding to the customer premise where the customer premise device is located when it is determined that a detected service subscriber includes a service subscriber corresponding to said customer premise where the customer premise device is located and ii) identifying, as the highest priority detected subscriber, a service subscriber who does not correspond to said customer premise as the highest priority service subscriber in the absence of detecting a subscriber corresponding to said customer premise where the customer premise device is located;

accessing stored service information corresponding to a detected service subscriber, said stored service information including a subscriber record corresponding to the detected service subscriber, said subscriber record including premium channel entitlement information indicating one or more premium channels which are to be provided to a customer premise of said detected service subscriber in accordance with a service agreement;

generating an updated list of program channels including channels that are to be supplied to the customer premise based on program guide settings corresponding to the highest priority detected subscriber and at least some of the accessed stored service information; and providing a service to the detected service subscriber via the customer premise device in accordance with the stored service information corresponding to the detected service subscriber.

2. The method of claim 1, wherein operating a customer premise device to detect one or more service subscribers in proximity to the customer premise device includes:
receiving a signal communicating the subscriber record including a subscriber identifier from a mobile user device.

3. The method of claim 1,
wherein said customer premise device is located at a customer premise which is different from said customer premise corresponding to said detected service subscriber; and
wherein accessing stored service information corresponding to a detected service subscriber includes retrieving, from a server, said subscriber record corresponding to the detected service subscriber.

4. The method of claim 1, wherein said subscriber record further includes:
information indicating channels and/or content which is not to be shared outside the customer premise to which the subscriber record corresponds, said customer premise to which the subscriber record corresponds being the customer premise corresponding to said detected service subscriber.

5. A method of providing services, the method comprising:
operating a customer premise device located at a customer premise to detect one or more service subscribers in proximity to the customer premise device;
identifying a highest priority detected subscriber in proximity to the customer premise device by i) identifying, as the highest priority detected subscriber, a detected subscriber corresponding to the customer premise where the customer premise device is located when it is determined that a detected service subscriber includes a service subscriber corresponding to said customer premise where the customer premise device is located and ii) identifying, as the highest priority detected subscriber, a service subscriber who does not correspond to said customer premise as the highest priority service subscriber in the absence of detecting a subscriber corresponding to said customer premise where the customer premise device is located;

accessing stored service information corresponding to a detected service subscriber, said stored service information including parental control information corresponding to said detected service subscriber;

generating an updated list of program channels including channels that are to be supplied to the customer premise based on program guide settings corresponding to the highest priority detected subscriber and at least some of the accessed stored service information;

providing a service to the detected service subscriber via the customer premise device in accordance with the stored service information corresponding to the detected service subscriber, wherein said detected service subscriber is a first service subscriber, the stored service information corresponding to the first service subscriber including user specified premium program channel location restriction information indicating which premium program channels may be displayed when the first service subscriber is located in the proximity of a customer premise device located at a second customer premise which is different from a customer premise of the first service subscriber; and wherein providing a service to the detected service subscriber includes blocking access to programs which said parental control information indicates said detected service subscriber is to be blocked from viewing.

6. The method of claim 5,
wherein said stored service information corresponding to the first service subscriber includes premium channel information identifying one or more premium channels said service subscriber is authorized to view; and
wherein providing a service to the detected service subscriber includes providing access to a premium channel said detected service subscriber is authorized to view at a customer premise of a second service subscriber who is not authorized to receive said premium channel.

7. The method of claim 5, wherein said user specified premium program channel restriction information includes user specified information indicating: i) that adult content premium program channels to which the first service subscriber subscribes are not to be displayed at customer premises other than the customer premise of the first service subscriber and ii) that sports content premium program channels to which the first service subscriber subscribes may be displayed at any location at which the first service subscriber is detected.

8. The method of claim 1, further comprising:
storing subscriber priority information; and
determining one or more service related features based on priority of subscribers who are detected to be in proximity to the customer premise device.

9. The method of claim 8, further comprising:
storing information associating a set of service subscribers with a first customer premise location;
wherein said storing subscriber priority information includes storing priority information for each of the service subscribers associated with the first customer premise location; and
determining from stored information subscriber customized settings associated with the service subscriber detected in the proximity of the customer premise device; and
wherein providing a service to the detected service subscriber via the customer premise device includes providing at least one service feature in accordance with a subscriber customized setting corresponding to the detected service subscriber having the highest priority.

10. The method of claim 9, wherein providing said at least one service feature includes providing a customized program channel listing configured in accordance with the subscriber customized settings corresponding to the detected service subscriber having the highest priority.

11. The method of claim 10, wherein the customized setting specifies a program guide listing format, said format being one of a program genre arranged program listing and a program listing arranged according to consecutive channel numbers.

12. The method of claim 11, wherein subscriber customized setting corresponding to the detected service subscriber having the highest priority is different from a subscriber customized setting corresponding to another detected service subscriber having a lower priority than said service subscriber having the highest priority thereby resulting in a different customized service than would be provided if said service subscriber having the highest priority was not detected.

13. The method of claim 1, wherein providing a service to the detected service subscriber includes:
presenting the service subscriber an opportunity to access stored content corresponding to said subscriber from a location which is different from a customer premise of said service subscriber.

14. The method of claim 1, wherein providing a service to the detected service subscriber includes:
presenting the service subscriber an opportunity to resume delivery of video which was being delivered to a different customer premise device from which said service subscriber initiated a content delivery session.

15. The method of claim 14, further comprising:
delivering content to said customer premise device which detected the presence of said service subscriber in response to the service subscriber signaling that content delivery of the video should resume, said resumption of content delivery including continuation a video delivery session which was initiated at said different customer premise device at said customer premise device which detected the presence of said service subscriber.

16. The method of claim 15, wherein said customer premise device which detected the presence of said service subscriber is located at a customer premise which is different from, and physically remote relative to the service subscriber customer premise from which the video delivery session was originally initiated.

17. The method of claim 16, further comprising:
prior to allowing resumption of said content delivery session, checking to determine if any subscribers detected in proximity to the customer premise device are restricted from viewing the video content being delivered by said video delivery session; and
said resumption of content delivery proceeding only after it is determined that no subscribers detected in proximity to the customer premise device are restricted from viewing the video content being delivered by said video delivery session.

18. A system for providing services, the system comprising:
a customer premise device located at a first customer premise configured to:
detect service subscribers in proximity to the customer premise device, the detected service subscribers including at least one detected service subscriber who is not a member of a household corresponding to said first customer premise;
identify a highest priority detected subscriber in proximity to the customer premise device by i) identifying, as the highest priority detected subscriber, a detected subscriber corresponding to the customer premise where the customer premise device is located when it is determined that a detected service subscriber includes a service subscriber corresponding to said customer premise where the customer premise device is located and ii) identifying, as the highest priority detected subscriber, a service subscriber who does not correspond to said customer premise as the highest priority service subscriber in the absence of detecting a subscriber corresponding to said customer premise where the customer premise device is located;
determine channels that are to be supplied to the first customer premise based on a service agreement information corresponding to said first customer premise;
determine additional channels which are to be made available at said first customer premise based on the detected presence of said at least one detected service subscriber who is not a member of the household;
generate an updated list of program channels including channels that are to be supplied to the first customer premise based on program guide settings corresponding to the highest priority detected subscriber, based on the service agreement information corresponding to said first customer premise and based on the additional channels which are to be made available based on the detected presence of said at least one detected service subscriber; and
provide a service to the detected service subscriber via the customer premise device in accordance with the stored service information corresponding to the detected service subscriber.

19. The system of claim 18,
wherein said customer premise device is a set top box located at the first customer premise.

20. The system of claim 19, wherein said set top box is further configured to:
determine if any of the detected service subscribers in proximity to the customer premise device correspond to the first customer premise where the customer premise device is located.

* * * * *